(12) United States Patent
Shirahatti et al.

(10) Patent No.: US 8,620,568 B2
(45) Date of Patent: Dec. 31, 2013

(54) NAVIGATION SYSTEM WITH CONGESTION ESTIMATION MECHANISM AND METHOD OF OPERATION THEREOF

(75) Inventors: Nikhil Shirahatti, San Jose, CA (US);
Ilya Eckstein, Palo Alto, CA (US);
Munir Estevane, Oakville, CA (US);
Pierre-Emmanuel Mazare, Mountain View, CA (US)

(73) Assignee: Telenav, Inc., Sunnyvale, CA (US)

( * ) Notice: Subject to any disclaimer, the term of this patent is extended or adjusted under 35 U.S.C. 154(b) by 0 days.

(21) Appl. No.: 13/338,955

(22) Filed: Dec. 28, 2011

(65) Prior Publication Data

US 2012/0166071 A1    Jun. 28, 2012

Related U.S. Application Data

(60) Provisional application No. 61/427,766, filed on Dec. 28, 2010.

(51) Int. Cl.
*G08G 1/00* (2006.01)

(52) U.S. Cl.
USPC ........................................ 701/118

(58) Field of Classification Search
USPC .......... 701/117, 118, 119, 200; 340/907, 910, 340/931
See application file for complete search history.

(56) References Cited

U.S. PATENT DOCUMENTS

| | | | |
|---|---|---|---|
| 5,428,545 A | 6/1995 | Maegawa et al. | |
| 5,566,072 A | 10/1996 | Momose et al. | |
| 5,732,383 A | 3/1998 | Foladare et al. | |
| 6,335,990 B1 | 1/2002 | Chen et al. | |
| 6,532,414 B2 | 3/2003 | Mintz | |
| 6,542,808 B2 * | 4/2003 | Mintz | 701/117 |
| 7,260,518 B2 | 8/2007 | Kerr et al. | |
| 7,453,864 B2 * | 11/2008 | Kennedy et al. | 370/351 |
| 7,706,965 B2 * | 4/2010 | Downs et al. | 701/117 |
| 7,822,540 B2 * | 10/2010 | Fukaya et al. | 701/439 |
| 7,831,433 B1 * | 11/2010 | Belvin et al. | 704/275 |
| 7,877,196 B2 | 1/2011 | Lin et al. | |
| 7,912,628 B2 | 3/2011 | Chapman et al. | |
| 8,024,110 B2 | 9/2011 | Fushiki et al. | |
| 8,090,524 B2 * | 1/2012 | Chapman et al. | 701/117 |
| 2004/0198386 A1 * | 10/2004 | Dupray | 455/456.1 |
| 2006/0123389 A1 | 6/2006 | Kolawa et al. | |
| 2007/0254675 A1 * | 11/2007 | Zorlu Ozer et al. | 455/456.2 |
| 2008/0248801 A1 | 10/2008 | Fletcher et al. | |
| 2009/0174572 A1 | 7/2009 | Smith | |
| 2009/0271101 A1 | 10/2009 | Relyea et al. | |

(Continued)

OTHER PUBLICATIONS

International Search Report for PCT Application No. PCT/US2011/067614 dated Mar. 9, 2012.

*Primary Examiner* — Thomas Tarcza
*Assistant Examiner* — Alex C Dunn
(74) *Attorney, Agent, or Firm* — IP Investment Law Group

(57) ABSTRACT

A method of operation of a navigation system includes: receiving a real-time traffic flow of road links; determining congestion candidate links from the road links by thresholding the real-time traffic flow of the road links; smoothing spatially the real-time traffic flow of the congestion candidate links; calculating a flow confidence of the real-time traffic flow of the congestion candidate links; determining a congested segment by tracking the real-time traffic flow and the flow confidence of the congestion candidate links over a time period; and generating a congestion message for the congested segment for displaying on a device.

20 Claims, 5 Drawing Sheets

(56) References Cited

U.S. PATENT DOCUMENTS

| | | |
|---|---|---|
| 2009/0281714 A1 | 11/2009 | Boubas et al. |
| 2010/0076670 A1 | 3/2010 | Turner et al. |
| 2011/0310733 A1* | 12/2011 | Tzamaloukas et al. ....... 370/230 |
| 2012/0150425 A1* | 6/2012 | Chapman et al. ............. 701/119 |

* cited by examiner

NAVIGATION SYSTEM WITH CONGESTION ESTIMATION MECHANISM AND METHOD OF OPERATION THEREOF

CROSS-REFERENCE TO RELATED APPLICATION(S)

This application claims the benefit of U.S. Provisional Patent Application Ser. No. 61/427,766 filed Dec. 28, 2010, and the subject matter thereof is incorporated herein by reference thereto.

TECHNICAL FIELD

The present invention relates generally to a navigation system, and more particularly to a system for a navigation system with congestion estimation mechanism.

BACKGROUND ART

Modern portable consumer and industrial electronics provide increasing levels of functionality to support modern life including location-based services. This is especially true for client devices such as navigation systems, cellular phones, portable digital assistants, and multifunction devices.

The navigation systems generally provide a recommended route from a starting point to a desired destination. Generally, the starting point and the desired destination are selected from a large database of roads stored in a mass media storage, such as a compact disc read-only memory (CD ROM) or a hard drive, which includes roads of an area to be traveled by a user. The navigation systems can also notify waypoints or times along the route.

As users adopt mobile location-based service devices, new and old usage begin to take advantage of this new device space. Navigation system and service providers are continually making improvement in the notification to enhance the user's experience in order to be competitive.

Thus, a need still remains for a navigation system with congestion estimation mechanism for increasing levels of functionality. In view of ease of use, it is increasingly critical that answers be found to these problems. In view of the ever-increasing commercial competitive pressures, along with growing consumer expectations and the diminishing opportunities for meaningful product differentiation in the marketplace, it is critical that answers be found for these problems. Additionally, the need to reduce costs, improve efficiencies and performance, and meet competitive pressures adds an even greater urgency to the critical necessity for finding answers to these problems.

Solutions to these problems have been long sought but prior developments have not taught or suggested any solutions and, thus, solutions to these problems have long eluded those skilled in the art.

DISCLOSURE OF THE INVENTION

The present invention provides a method of operation of a navigation system including: receiving a real-time traffic flow of road links; determining congestion candidate links from the road links by thresholding the real-time traffic flow of the road links; smoothing spatially the real-time traffic flow of the congestion candidate links; calculating a flow confidence of the real-time traffic flow of the congestion candidate links; determining a congested segment by tracking the real-time traffic flow and the flow confidence of the congestion candidate links over a time period; and generating a congestion message for the congested segment for displaying on a device.

The present invention provides a navigation system, including: a flow receiver module, for receiving a real-time traffic flow of road links; a threshold module, coupled to the flow receiver module, for determining congestion candidate links from the road links by thresholding the real-time traffic flow of the road links; a smooth filter module, coupled to the threshold module, for determining the congestion candidate links from the road links by thresholding the real-time traffic flow of the road links; a source confidence module, coupled to the smooth filter module, for determining the congestion candidate links from the road links by thresholding the real-time traffic flow of the road links; a tracker module, coupled to the source confidence module, for determining the congestion candidate links from the road links by thresholding the real-time traffic flow of the road links; and a congestion reporter module, coupled to the tracker module, for generating a congestion message for a congested segment for displaying on a device.

Certain embodiments of the invention have other steps or elements in addition to or in place of those mentioned above. The steps or elements will become apparent to those skilled in the art from a reading of the following detailed description when taken with reference to the accompanying drawings.

BEST MODE FOR CARRYING OUT THE INVENTION

Figure 1:
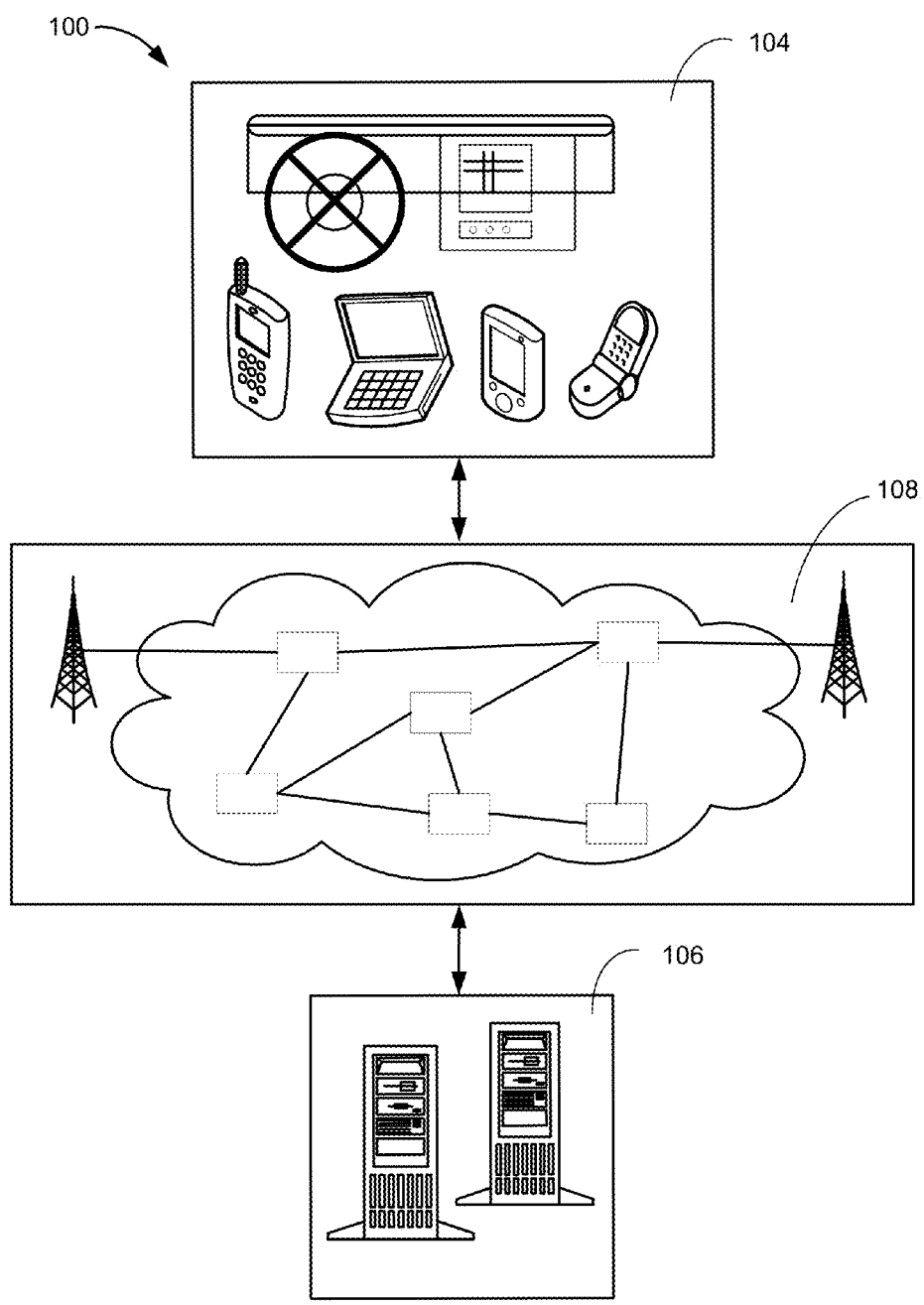
FIG. 1 is a navigation system with congestion estimation mechanism in an embodiment of the present invention.

The following embodiments are described in sufficient detail to enable those skilled in the art to make and use the invention. It is to be understood that other embodiments would be evident based on the present disclosure, and that system, process, or mechanical changes may be made without departing from the scope of the present invention.

In the following description, numerous specific details are given to provide a thorough understanding of the invention. However, it will be apparent that the invention may be practiced without these specific details. In order to avoid obscuring the present invention, some well-known circuits, system configurations, and process steps are not disclosed in detail.

The drawings showing embodiments of the system are semi-diagrammatic and not to scale and, particularly, some of the dimensions are for the clarity of presentation and are shown exaggerated in the drawing FIGs. Similarly, although the views in the drawings for ease of description generally show similar orientations, this depiction in the FIGs. is arbitrary for the most part. Generally, the invention can be operated in any orientation. The embodiments have been numbered first embodiment, second embodiment, etc. as a matter of descriptive convenience and are not intended to have any other significance or provide limitations for the present invention.

One skilled in the art would appreciate that the format with which navigation information is expressed is not critical to some embodiments of the invention. For example, in some embodiments, navigation information is presented in the format of (X, Y), where X and Y are two ordinates that define the geographic location, i.e., a position of a user.

In an alternative embodiment, navigation information is presented by longitude and latitude related information. In a further embodiment of the present invention, the navigation information also includes a velocity element including a speed component and a heading component.

The term "relevant information" referred to herein includes the navigation information described as well as information relating to points of interest to the user, such as local business, hours of businesses, types of businesses, advertised specials, traffic information, maps, local events, and nearby community or personal information.

The term "module" referred to herein can include software, hardware, or a combination thereof of the present invention in accordance with the context in which the term is used. For example, the software can be machine code, firmware, embedded code, and application software. Also for example, the hardware can be circuitry, processor, computer, integrated circuit, integrated circuit cores, a pressure sensor, an inertial sensor, a microelectromechanical system (MEMS), passive devices, or a combination thereof.

Referring now to FIG. 1, therein is shown a navigation system 100 with congestion estimation mechanism in an embodiment of the present invention. The navigation system 100 includes a first device 104, such as a client or a server, connected to a second device 106, such as a client or server, with a communication path 108, such as a wireless or wired network.

For example, the first device 104 can be of any of a variety of mobile devices, such as a cellular phone, personal digital assistant, a notebook computer, automotive telematic navigation system, or other multi-functional mobile communication or entertainment device. The first device 104 can be a standalone device, or can be incorporated with a vehicle, for example a car, truck, bus, or train. The first device 104 can couple to the communication path 108 to communicate with the second device 106.

For illustrative purposes, the navigation system 100 is described with the first device 104 as a mobile computing device, although it is understood that the first device 104 can be different types of computing devices. For example, the first device 104 can also be a non-mobile computing device, such as a server, a server farm, or a desktop computer.

In another example, the first device 104 can be a particularized machine, such as a mainframe, a server, a cluster server, rack mounted server, or a blade server, or as more specific examples, an IBM System z10™ Business Class mainframe or a HP ProLiant ML™ server. Yet another example, the second device 106 can be a particularized machine, such as a portable computing device, a thin client, a notebook, a netbook, a smartphone, personal digital assistant, or a cellular phone, and as specific examples, an Apple iPhone™, Palm Centro™, or Moto Q Global™.

The second device 106 can be any of a variety of centralized or decentralized computing devices. For example, the second device 106 can be a computer, grid computing resources, a virtualized computer resource, cloud computing resource, routers, switches, peer-to-peer distributed computing devices, or a combination thereof.

The second device 106 can be centralized in a single computer room, distributed across different rooms, distributed across different geographical locations, embedded within a telecommunications network. The second device 106 can have a means for coupling with the communication path 108 to communicate with the first device 104. The second device 106 can also be a client type device as described for the first device 104.

For illustrative purposes, the navigation system 100 is described with the second device 106 as a non-mobile computing device, although it is understood that the second device 106 can be different types of computing devices. For example, the second device 106 can also be a mobile computing device, such as notebook computer, another client device, or a different type of client device. The second device 106 can be a standalone device, or can be incorporated with a vehicle, for example a car, truck, bus, or train.

Also for illustrative purposes, the navigation system 100 is shown with the second device 106 and the first device 104 as end points of the communication path 108, although it is understood that the navigation system 100 can have a different partition between the first device 104, the second device 106, and the communication path 108. For example, the first device 104, the second device 106, or a combination thereof can also function as part of the communication path 108.

The communication path 108 can be a variety of networks. For example, the communication path 108 can include wireless communication, wired communication, optical, ultrasonic, or the combination thereof. Satellite communication, cellular communication, Bluetooth, Infrared Data Association standard (IrDA), wireless fidelity (WiFi), and worldwide interoperability for microwave access (WiMAX) are examples of wireless communication that can be included in the communication path 108. Ethernet, digital subscriber line (DSL), fiber to the home (FTTH), and plain old telephone service (POTS) are examples of wired communication that can be included in the communication path 108.

Further, the communication path 108 can traverse a number of network topologies and distances. For example, the communication path 108 can include direct connection, personal area network (PAN), local area network (LAN), metropolitan area network (MAN), wide area network (WAN) or any combination thereof.

Figure 2:
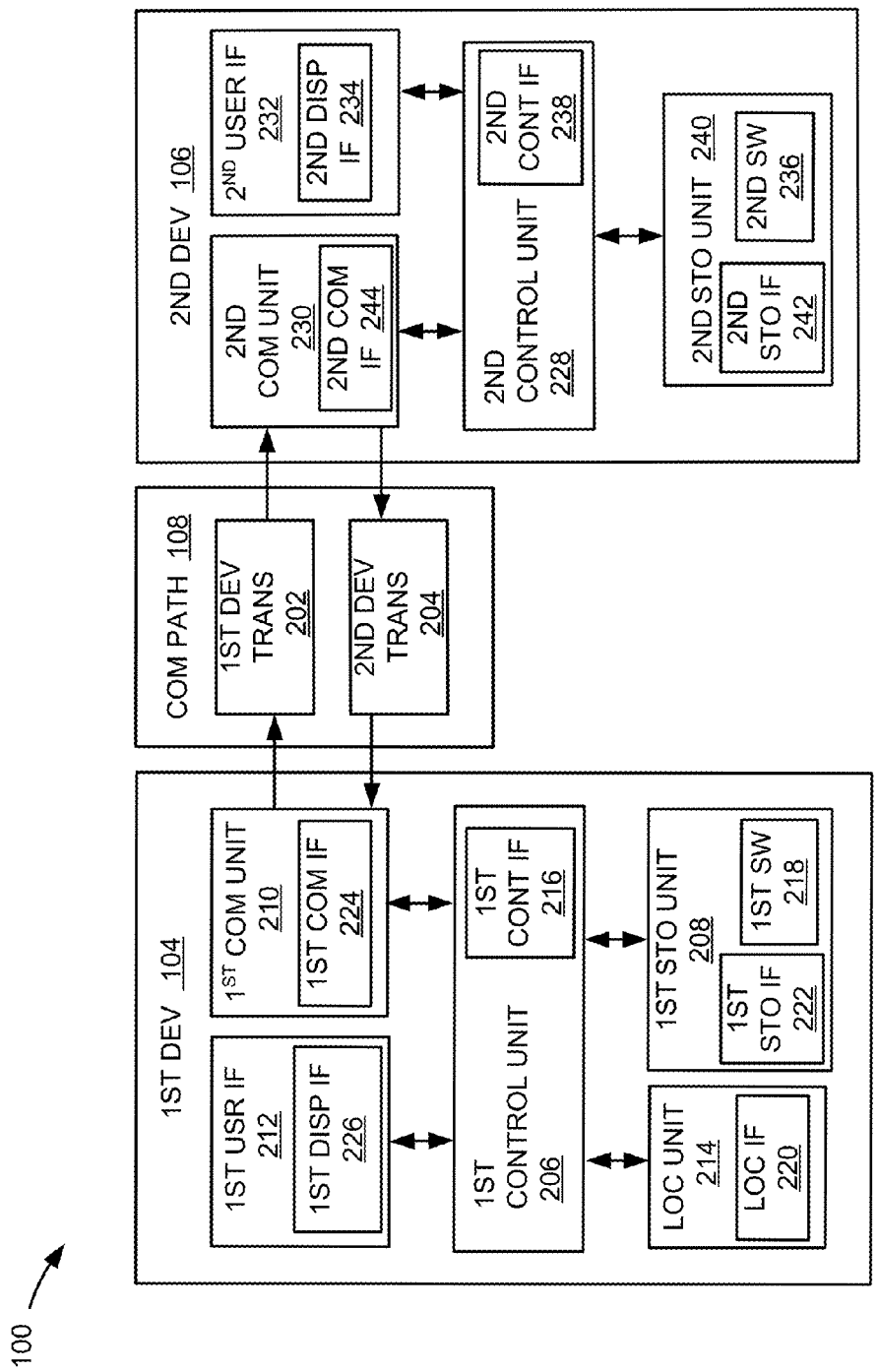
FIG. 2 is an exemplary block diagram of the navigation system.

Referring now to FIG. 2, therein is shown an exemplary block diagram of the navigation system 100 of FIG. 1. The navigation system 100 can include the first device 104, the communication path 108, and the second device 106. The first device 104 can send information in a first device transmission 202 over the communication path 108 to the second device 106. The second device 106 can send information in a second device transmission 204 over the communication path 108 to the first device 104.

For illustrative purposes, the navigation system 100 is shown with the first device 104 as a client device, although it is understood that the navigation system 100 can have the first device 104 as a different type of device. For example, the first device 104 can be a server.

Also for illustrative purposes, the navigation system 100 is shown with the second device 106 as a server, although it is understood that the navigation system 100 can have the second device 106 as a different type of device. For example, the second device 106 can be a client device.

For brevity of description in this embodiment of the present invention, the first device 104 will be described as a client device and the second device 106 will be described as a server device. The present invention is not limited to this selection for the type of devices. The selection is an example of the present invention.

The first device 104 can include a first control unit 206, a first storage unit 208, a first communication unit 210, a first user interface 212, and a location unit 214. The first control unit 206 can include a first control interface 216. The first control unit 206 can execute a first software 218 to provide the intelligence of the navigation system 100. The first control unit 206 can be implemented in a number of different manners. For example, the first control unit 206 can be a processor, an embedded processor, a microprocessor, a hardware control logic, a hardware finite state machine (FSM), a digital signal processor (DSP), or a combination thereof.

The first control interface 216 can be used for communication between the first control unit 206 and other functional units in the first device 104. The first control interface 216 can also be used for communication that is external to the first device 104.

The first control interface 216 can receive information from the other functional units or from external sources, or can transmit information to the other functional units or to external destinations. The external sources and the external destinations refer to sources and destinations physically separate from the first device 104.

The first control interface 216 can be implemented in different ways and can include different implementations depending on which functional units or external units are being interfaced with the first control interface 216. For example, the first control interface 216 can be implemented with a pressure sensor, an inertial sensor, a microelectromechanical system (MEMS), optical circuitry, waveguides, wireless circuitry, wireline circuitry, or a combination thereof.

The location unit 214 can generate location information, current heading, and current speed of the first device 104, as examples. The location unit 214 can be implemented in many ways. For example, the location unit 214 can function as at least a part of a global positioning system (GPS), an inertial navigation system, a cellular-tower location system, a pressure location system, or any combination thereof.

The location unit 214 can include a location interface 220. The location interface 220 can be used for communication between the location unit 214 and other functional units in the first device 104. The location interface 220 can also be used for communication that is external to the first device 104.

The location interface 220 can receive information from the other functional units or from external sources, or can transmit information to the other functional units or to external destinations. The external sources and the external destinations refer to sources and destinations physically separate from the first device 104.

The location interface 220 can include different implementations depending on which functional units or external units are being interfaced with the location unit 214. The location interface 220 can be implemented with technologies and techniques similar to the implementation of the first control interface 216.

The first storage unit 208 can store the first software 218. The first storage unit 208 can also store the relevant information, such as advertisements, points of interest (POI), navigation routing entries, or any combination thereof.

The first storage unit 208 can be a volatile memory, a nonvolatile memory, an internal memory, an external memory, or a combination thereof. For example, the first storage unit 208 can be a nonvolatile storage such as non-volatile random access memory (NVRAM), Flash memory, disk storage, or a volatile storage such as static random access memory (SRAM).

The first storage unit 208 can include a first storage interface 222. The first storage interface 222 can be used for communication between the first storage unit 208 and other functional units in the first device 104. The first storage interface 222 can be also used for communication that is external to the first device 104.

The first storage interface 222 can receive information from the other functional units or from external sources, or can transmit information to the other functional units or to external destinations. The external sources and the external destinations refer to sources and destinations physically separate from the first device 104.

The first storage interface 222 can include different implementations depending on which functional units or external units are being interfaced with the first storage unit 208. The first storage interface 222 can be implemented with technologies and techniques similar to the implementation of the first control interface 216.

The first communication unit 210 can enable external communication to and from the first device 104. For example, the first communication unit 210 can permit the first device 104 to communicate with the second device 106 of FIG. 1, an attachment, such as a peripheral device or a computer desktop, and the communication path 108.

The first communication unit 210 can also function as a communication hub allowing the first device 104 to function as part of the communication path 108 and not limited to be an end point or terminal unit to the communication path 108. The first communication unit 210 can include active and passive components, such as microelectronics or an antenna, for interaction with the communication path 108.

The first communication unit 210 can include a first communication interface 224. The first communication interface 224 can be used for communication between the first communication unit 210 and other functional units in the first device 104. The first communication interface 224 can receive information from the other functional units or can transmit information to the other functional units.

The first communication interface 224 can include different implementations depending on which functional units are being interfaced with the first communication unit 210. The first communication interface 224 can be implemented with technologies and techniques similar to the implementation of the first control interface 216.

The first user interface 212 allows a user (not shown) to interface and interact with the first device 104. The first user interface 212 can include an input device and an output device. Examples of the input device of the first user interface 212 can include a keypad, a touchpad, soft-keys, a keyboard, a microphone, or any combination thereof to provide data and communication inputs.

The first user interface 212 can include a first display interface 226. The first display interface 226 can include a display, a projector, a video screen, a speaker, or any combination thereof.

The first control unit 206 can operate the first user interface 212 to display information generated by the navigation system 100. The first control unit 206 can also execute the first software 218 for the other functions of the navigation system 100, including receiving location information from the location unit 214. The first control unit 206 can further execute the first software 218 for interaction with the communication path 108 via the first communication unit 210.

The second device 106 can be optimized for implementing the present invention in a multiple device embodiment with the first device 104. The second device 106 can provide the additional or higher performance processing power compared to the first device 104. The second device 106 can include a second control unit 228, a second communication unit 230, and a second user interface 232.

The second user interface 232 allows a user (not shown) to interface and interact with the second device 106. The second user interface 232 can include an input device and an output device. Examples of the input device of the second user interface 232 can include a keypad, a touchpad, soft-keys, a keyboard, a microphone, or any combination thereof to provide data and communication inputs. Examples of the output device of the second user interface 232 can include a second display interface 234. The second display interface 234 can include a display, a projector, a video screen, a speaker, or any combination thereof.

The second control unit 228 can execute a second software 236 to provide the intelligence of the second device 106 of the navigation system 100. The second software 236 can operate in conjunction with the first software 218. The second control unit 228 can provide additional performance compared to the first control unit 206.

The second control unit 228 can operate the second user interface 232 to display information. The second control unit 228 can also execute the second software 236 for the other functions of the navigation system 100, including operating the second communication unit 230 to communicate with the first device 104 over the communication path 108.

The second control unit 228 can be implemented in a number of different manners. For example, the second control unit 228 can be a processor, an embedded processor, a microprocessor, a hardware control logic, a hardware finite state machine (FSM), a digital signal processor (DSP), or a combination thereof.

The second control unit 228 can include a second control interface 238. The second control interface 238 can be used for communication between the second control unit 228 and other functional units in the second device 106. The second control interface 238 can also be used for communication that is external to the second device 106.

The second control interface 238 can receive information from the other functional units or from external sources, or can transmit information to the other functional units or to external destinations. The external sources and the external destinations refer to sources and destinations physically separate from the second device 106.

The second control interface 238 can be implemented in different ways and can include different implementations depending on which functional units or external units are being interfaced with the second control interface 238. For example, the second control interface 238 can be implemented with a pressure sensor, an inertial sensor, a microelectromechanical system (MEMS), optical circuitry, waveguides, wireless circuitry, wireline circuitry, or a combination thereof.

A second storage unit 240 can store the second software 236. The second storage unit 240 can also store the relevant information, such as advertisements, points of interest (POI), navigation routing entries, or any combination thereof. The second storage unit 240 can be sized to provide the additional storage capacity to supplement the first storage unit 208.

For illustrative purposes, the second storage unit 240 is shown as a single element, although it is understood that the second storage unit 240 can be a distribution of storage elements. Also for illustrative purposes, the navigation system 100 is shown with the second storage unit 240 as a single hierarchy storage system, although it is understood that the navigation system 100 can have the second storage unit 240 in a different configuration. For example, the second storage unit 240 can be formed with different storage technologies forming a memory hierarchal system including different levels of caching, main memory, rotating media, or off-line storage.

The second storage unit 240 can be a volatile memory, a nonvolatile memory, an internal memory, an external memory, or a combination thereof. For example, the second storage unit 240 can be a nonvolatile storage such as non-volatile random access memory (NVRAM), Flash memory, disk storage, or a volatile storage such as static random access memory (SRAM).

The second storage unit 240 can include a second storage interface 242. The second storage interface 242 can be used for communication between the second storage unit 240 and other functional units in the second device 106. The second storage interface 242 can be used for communication that is external to the second device 106.

The second storage interface 242 can receive information from the other functional units or from external sources, or can transmit information to the other functional units or to external destinations. The external sources and the external destinations refer to sources and destinations physically separate from the second device 106.

The second storage interface 242 can include different implementations depending on which functional units or external units are being interfaced with the second storage unit 240. The second storage interface 242 can be implemented with technologies and techniques similar to the implementation of the second control interface 238.

The second communication unit 230 can enable external communication to and from the second device 106. For example, the second communication unit 230 can permit the second device 106 to communicate with the first device 104 over the communication path 108.

The second communication unit 230 can also function as a communication hub allowing the second device 106 to function as part of the communication path 108 and not limited to be an end point or terminal unit to the communication path 108. The second communication unit 230 can include active and passive components, such as microelectronics or an antenna, for interaction with the communication path 108.

The second communication unit 230 can include a second communication interface 244. The second communication interface 244 can be used for communication between the second communication unit 230 and other functional units in the second device 106. The second communication interface 244 can receive information from the other functional units or can transmit information to the other functional units.

The second communication interface 244 can include different implementations depending on which functional units are being interfaced with the second communication unit 230. The second communication interface 244 can be implemented with technologies and techniques similar to the implementation of the second control interface 238.

The first communication unit 210 can couple with the communication path 108 to send information to the second device 106 in the first device transmission 202. The second device 106 can receive information in the second communication unit 230 from the first device transmission 202 of the communication path 108.

The second communication unit 230 can couple with the communication path 108 to send information to the first device 104 in the second device transmission 204. The first device 104 can receive information in the first communication unit 210 from the second device transmission 204 of the communication path 108. The navigation system 100 can be executed by the first control unit 206, the second control unit 228, or a combination thereof.

For illustrative purposes, the second device 106 is shown with the partition having the second user interface 232, the second storage unit 240, the second control unit 228, and the second communication unit 230, although it is understood that the second device 106 can have a different partition. For example, the second software 236 can be partitioned differently such that some or all of its function can be in the second control unit 228 and the second communication unit 230. Also, the second device 106 can include other functional units not shown in FIG. 2 for clarity.

The functional units in the first device 104 can work individually and independently of the other functional units. The first device 104 can work individually and independently from the second device 106 and the communication path 108.

The functional units in the second device 106 can work individually and independently of the other functional units. The second device 106 can work individually and independently from the first device 104 and the communication path 108.

For illustrative purposes, the navigation system 100 is described by operation of the first device 104 and the second device 106. It is understood that the first device 104 and the second device 106 can operate any of the modules and functions of the navigation system 100. For example, the first device 104 is described to operate the location unit 214, although it is understood that the second device 106 can also operate the location unit 214.

Figure 3:
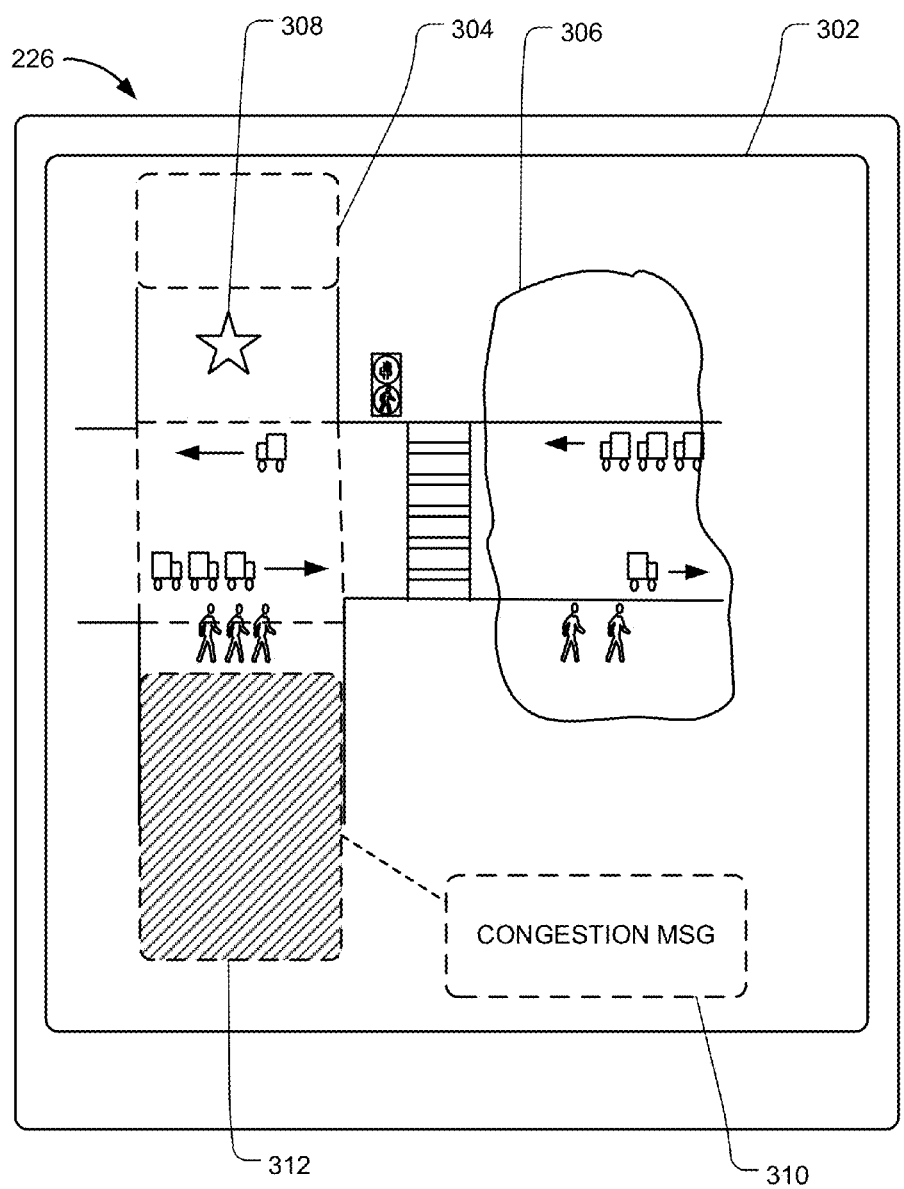
FIG. 3 is an example of a location-based guide on the first display interface of the first device of FIG. 1.

Referring now to FIG. 3, therein is shown an example of a location-based guide 302 on the first display interface 226 of the first device 104 of FIG. 1. The location-based guide 302 is defined as a visual presentation of navigation information. For example, the navigation information can be a map, a street name, a turn-by-turn instruction, or any relevant information for navigation purposes. Either the first display interface 226 or the second display interface 234 of FIG. 2, or both can represent the location-based guide 302.

The location-based guide 302 can include representations of road links 304 with vehicles and pedestrians. The road links 304 are defined as segments of real-world pathways, such as streets, highways, avenues, crosswalks, or roads. There can also be a cross walk presented in the display interface for the pedestrians to cross. Pedestrians are shown walking along the road links 304 or crossing the road links 304.

The location-based guide 302 can represent a no-signal region 306, as shown with a wavy boundary. The no-signal region 306 is defined as a physical space where that has no location service. Location service can be available on either or both sides of the no-signal region 306.

The location-based guide 302 can also include a current location 308. The current location 308 is defined as the current physical location of the first device 104. For example, the current location 308 is shown to be close to the intersection in FIG. 3.

The location-based guide 302 can include a congestion message 310, which is defined as a notification related to a physical region having characteristics of a congestion occurring therein. The congestion message 310 can be visual, tactile, audio, or a combination thereof. The visual portion of the congestion message 310 can be displayed on the location-based guide 302 via either the first display interface 226 or the second display interface 234, or both. The audio or tactile portion of the congestion message 310 can be expressed by either the first user interface 212 of FIG. 2 or the second user interface 232 of FIG. 2, or both. For example, the congestion message 310 is shown as "CONGESTION REPORT" to provide an estimation of congestion inferred at a congested segment 312 presented in the display interface.

The congested segment 312 is defined as one or more of the road links 304 that has been determined by the navigation system 100 to be congested. The congestion message 310 about the congested segment 312 is shown in a textual representation, although it is understood that the congestion message 310 can be presented with any visual, audible, or mechanical means. For example, the congestion message 310 can be presented with text, images, audio, video, graphics, vibration, or a combination thereof.

The congestion message 310 can be repeated at a user-defined repetition interval. The congestion message 310 can also expire after a user-defined expiration interval.

Figure 4:
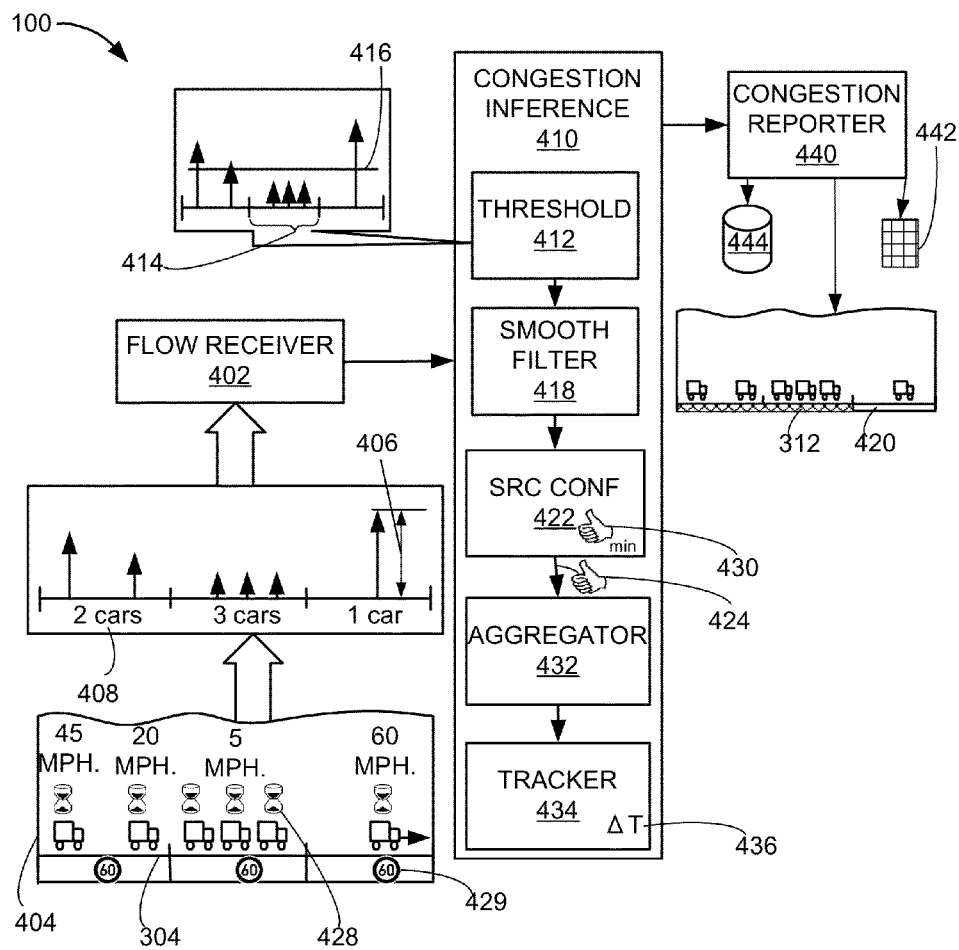
FIG. 4 is a control flow of the navigation system.

Referring now to FIG. 4, therein is shown a control flow of the navigation system 100. The navigation system 100 can determine congestion inference from flow data. The navigation system 100 can include a flow receiver module 402. The flow receiver module 402 is defined as a module of the navigation system 100 for detecting traffic flows. The flow receiver module 402 can monitor flow or speed of vehicles, pedestrians, or other moving objects on the road links 304. The flow receiver module 402 can function to receive a real-time traffic flow 404 of the road links 304.

The real-time traffic flow 404 is defined as a real-time report of vehicle velocities 406 and a vehicle count 408 for each of the road links 304. The vehicle velocities 406 are presented by the magnitudes of arrows shown, and the vehicle count 408 are represented by the number of arrows in each of the road links 304. The flow receiver module 402 can receive the real-time traffic flow 404 from the first communication interface 224 of FIG. 2.

The flow receiver module 402 can receive the real-time traffic flow 404 for either or both sides of the road. Although the vehicle velocities 406 and the vehicle counts 408 are shown as the speed and count of cars and vehicles, it is understood that the vehicle velocities 406 and the vehicle counts 408 can represent other moving objects as well.

The flow receiver module 402 can receive the real-time traffic flow 404 from probe or sample data. The flow receiver module 402 can receive the real-time traffic flow 404 from the department of transportation (DOT). The real-time traffic flow 404 can be received from a data source through the communication path 108 of FIG. 1 via the first communication interface 224 of FIG. 2 or the second communication interface 244 of FIG. 2. The real-time traffic flow 404 can be sent from the second device 106 of FIG. 1 to the first device 104 of FIG. 1. The flow receiver module 402 can aggregate the real-time traffic flow 404 of the road links 304 as historical data for other modules of the navigation system 100 to predict likely congested areas in the future or use the data as a check to verify incidents. The flow receiver module 402 can determine speed density based on a number of cars traveled during a specific duration of time.

The navigation system 100 can include a congestion inference module 410. The congestion inference module 410 is defined as a module of the navigation system 100 for determining the congested segment 312 from the real-time traffic flow 404 of the road links 304. The congestion inference module 410 can be coupled to the flow receiver module 402 to receive the real-time traffic flow 404 from the flow receiver module 402 to determine the congested segment 312. When there is the first device 104 is in the no-signal region 306 of FIG. 3, where there is no location service, such as global position system (GPS) or cellular service, the congestion inference module 410 can predict if there is congestion based on multi-modal transportation data of different transportation types including car, walking, or any other transportation types. The congested segment 312 can be predicted by monitoring flow of pedestrians crossing a crosswalk.

The congestion inference module 410 can include a threshold module 412. The threshold module 412 is defined as a module of the navigation system 100 for determining a candidate road link that is congested by thresholding the real-time traffic flow 404 of the road links 304. The threshold module 412 can use the real-time traffic flow 404 received from the flow receiver module 402. The threshold module 412 can function to determine congestion candidate links 414 from the road links 304 by thresholding the real-time traffic flow 404 of the road links 304. The congestion candidate links 414 are defined as a subset of the road links 304 that has been determined to have slowed down enough to potentially be the road links contained in the congestion segment 312.

The threshold module 412 can identify one instance of the road links 304 as one of the congestion candidate links 414 when the vehicle velocities 406 in the one instance are all below or equal to a speed threshold 416. The speed threshold 416 can be user-defined or determined by the navigation system 100. For example, the speed threshold 416 can be calculated based on speed limits of the road links 304.

For illustrative purposes, the speed threshold 416 is shown to be a flat line in FIG. 4. However, it is understood that the speed threshold 416 can be a step function having flat threshold values for each individual one of the road links 304 based on characteristics of the road links 304, such as speed limits or road widths of the road links 304.

The threshold module 412 can identify the one instance of the road links 304 as one of the congestion candidate links 414 when at least one of the vehicle velocities 406 in the one instance is below or equal to the speed threshold 416. Further, the threshold module 412 can identify the one instance of the road links 304 as one of the congestion candidate links 414 when a percentage of the vehicle velocities 406 in the one instance is below or equal to the speed threshold 416. Yet further, the threshold module 412 can identify the one instance of the road links 304 as one of the congestion candidate links 414 when a weighted percentage of the vehicle velocities 406 in the one instance is below or equal to the speed threshold 416.

The congestion inference module 410 can include a smooth filter module 418. The smooth filter module 418 is defined as a module of the navigation system 100 for smoothing the real-time traffic flow 404 of the road links 304 with a filter. The smooth filter module 418 can use the real-time traffic flow 404 received from the flow receiver module 402. The smooth filter module 418 can be coupled to the threshold module 412 to receive the congestion candidate links 414 from the threshold module 412. The smooth filter module 418 can function to smooth spatially the real-time traffic flow 404 of the congestion candidate links 414. The smooth filter module 418 can further function to smooth temporally the real-time traffic flow 404 of the congestion candidate links 414 based on a previously received instance of the real-time traffic flow 404 of the congestion candidate links 414.

The smooth filter module 418 can filter the real-time traffic flow 404 of the congestion candidate links 414 received from the threshold module 412. The smooth filter module 418 can filter the real-time traffic flow 404 with a Laplacian filter, a low-pass filter, or other smoothing mechanisms.

The smooth filter module 418 can receive the real-time traffic flow 404 of a neighbor link 420 of the congestion candidate links 414 for smoothing the real-time traffic flow 404 of the congestion candidate links 414. The neighbor link 420 is defined as a road link adjacent to and connected to one of the congestion candidate links 414 in the physical world, where the neighbor link 420 is not one of the congestion candidate links 414.

It has been discovered that smoothing or filtering the real-time traffic flow 404 spatially and temporally increases the accuracy of the congestion estimation mechanism of the navigation system 100. Smoothing or filtering the real-time traffic flow 404 spatially accommodates the navigation system 100 by accounting for packet movements of a congested road link. Smoothing or filtering the real-time traffic flow 404 temporally accommodates the navigation system 100 by accounting for stop-and-go patterns of vehicles in the congested road link. Therefore, smoothing or filtering the real-time traffic flow 404 increases the accuracy of the congestion estimation mechanism by accounting for potential scenarios that may mislead a navigation system with congestion estimation.

The congestion inference module 410 can include a source confidence module 422. The source confidence module 422 is defined as a module of the navigation system 100 for determining a flow confidence 424 of the real-time traffic flow 404 of the road links 304. The flow confidence 424 is defined as an estimation of the probability that the real-time traffic flow 404 is an accurate assessment of the real-world traffic situation. The flow confidence 424 can depend on the source of the real-time traffic flow 404, user input, method of estimation used to generate the real-time traffic flow 404, or other metadata associated with the real-time traffic flow 404.

The source confidence module 422 can function to calculate the flow confidence 424 of the real-time traffic flow 404 of the congestion candidate links 414. The source confidence module 422 can be coupled to the smooth filter module 418 to receive the congestion candidate links 414 after they are filtered or smoothed by the smooth filter module 418. The source confidence module 422 can calculate the flow confidence 424 of the real-time traffic flow based on the real-time traffic flow 404 received from the flow receiver module 402.

The source confidence module 422 can calculate the flow confidence 424 of the real-time traffic flow 404 of the congestion candidate links 414 based on a vehicle count 408 of the congestion candidate links 414. For example, each of the flow confidence 424 can be increased if the vehicle count 408 in each of the congestion candidate links 414 is above or equal to a user-defined count threshold, and decreased linearly based on how much the user-defined count threshold exceeds the vehicle count 408.

The source confidence module 422 can calculate the flow confidence 424 of the real-time traffic flow 404 of each of the congestion candidate links 414 based on an age 428 of the real-time traffic flow 404. The age 428 of the real-time traffic flow 404 is defined as the amount of time that has passed since the real-time traffic flow 404 has last been received by the navigation system 100. For example, each of the flow confidence 424 can be increased if the age 428 of the real-time traffic flow 404 for each of the congestion candidate links 414 is below or equal to a user-defined age threshold, and decreased linearly based on how much the age 428 exceeds the user-defined age threshold.

The source confidence module 422 can calculate the flow confidence 424 of the real-time traffic flow 404 of each of the congestion candidate links 414 based on the real-time traffic flow 404 of the neighbor link 420 of each of the congestion candidate links 414. For example, the flow confidence 424 can be increased when the real-time traffic flow 404 of the neighbor link 420 is within a user-defined deviation threshold from a range or an average of the real-time traffic flow 404 of each of the congestion candidate links 414, and decreased when the real-time traffic flow 404 of the neighbor link 420 is not within the user-defined deviation.

The source confidence module 422 can calculate the flow confidence 424 of the real-time traffic flow 404 based on an average speed limit 429 of the congested segment 312. For example, the flow confidence 424 can be increased when the average speed limit 429 of the congested segment 312 is within a user-defined deviation from an average of the vehicle velocities 406 of the real-time traffic flow 404 of the congestion candidate links 414.

The source confidence module 422 can be for filtering out a portion of the real-time traffic flow 404 of the congestion candidate links 414 when the flow confidence 424 of the portion is below or equal to a minimum confidence 430. The minimum confidence 430 is defined as a confidence level threshold above which the real-time traffic flow 404 will be deemed sufficient to corroborate or dispute the congested state of the congested segment 312. When the flow confidence 424 is equal to or below the minimum confidence 430, the real-time traffic flow 404 will be deemed irrelevant to the determination of the congested segment 312.

The congestion inference module 410 can include an aggregator module 432. The aggregator module 432 is defined as a module of the navigation system 100 for aggregating the congestion candidate links 414 adjacent to each other into the congested segment 312. A road link is adjacent to another road link when the road link is connected to the another road link in the physical world. The aggregator module 432 can be coupled to the smooth filter module 418 to receive the real-time traffic flow 404 of the congestion candidate links 414 for determining the congested segment 312.

The aggregator module 432 can aggregate an instance of the congestion candidate links 414 and another instance of the congestion candidate links 414 into the congested segment 312 when the real-time traffic flow 404 of the instance is within a difference percentile from the real-time traffic flow 404 of the another instance. The difference percentile can be user-defined or calculated by the aggregator module 432, such as based on speed limits of the road links 414.

The aggregator module 432 can be coupled to the source confidence module 422. The aggregator module 432 can aggregate an instance of the congestion candidate links 414 and another instance of the congestion candidate links 414 into the congested segment 312 when the flow confidence 424 of the instance is within a confidence difference percentile from the flow confidence 424 of the another instance, where the flow confidence 424 is received from the source confidence module 422. The confidence difference percentile can be user-defined or calculated by the source confidence module 422.

Optionally, the aggregator module 432 can perform another thresholding similar to the threshold module 412. The aggregator module 432 can filter the congestion candidate links 414 based on a threshold or a smoothing mechanism prior to aggregating the candidate links 414 into the congested segment 312. Each of the congestion candidate links 414 that has the real-time traffic flow 404 received from the smooth filter module 418 below the speed threshold 416 can be removed or filtered from the congestion candidate links 414. The speed threshold 416 used in the aggregator module 432 can be the same or different from the speed threshold 416 used in the threshold module 412 of the navigation system 100.

It has been discovered that thresholding the real-time traffic flow 404 before and after smoothing the real-time traffic flow 404 of the candidate links 414 increases the accuracy of the congestion estimation mechanism of the navigation system 100. The double thresholding allow the navigation system 100 to accurately infer a congestion state despite variance in the traffic flow and the stop-and-go patterns of congested road links.

The congestion inference module 410 can include a tracker module 434. The tracker module 434 is defined as a module of the navigation system 100 for tracking temporally the real-time traffic flow 404 of the road links 304 for a time period 436. The time period 436 is defined as a constant interval of time. The time period 436 can be user-defined or determined based on the zoom setting of the location-based guide 302 of FIG. 3.

The tracker module 434 can be coupled to the aggregator module 432 to receive the congested segment 312. The tracker module 434 can function to determine the congested segment 312 by tracking the real-time traffic flow 404 and the flow confidence 424 of the congestion candidate links 414 over the time period 436.

The tracker module 434 can be for determining the congested segment 312 based on length of the congestion candidate links 414. For example, the congested segment 312 can be determined or validated when the congestion candidate links 414 in the congested segment 312 are within a range of physical length or a range of the total number of links. The tracker module 434 can be for determining the congested segment 312 based on the average speed limit 429 of the congested segment 312. For example, the congested segment 312 can be determined or validated when the average speed limit 429 of the congested segment 312 is within a user-defined deviation from an average of the vehicle velocities 406 of the real-time traffic flow 404 of the congestion segment 312.

The tracker module 434 can be for determining the congested segment 312 including smoothing temporally the real-time traffic flow 404 of the congestion candidate links 414 over the time period 436. The tracker module 434 can perform the smoothing temporally with the same filters as that of the smooth filter module 418, where the real-time traffic flow 404 is smoothed relative to a previously received instance of the real-time traffic flow 404.

The navigation system 100 can include a congestion reporter module 440. The congestion reporter module 440 is defined as a module of the navigation system 100 for reporting the congested segment 312 to a user of the navigation system 100. The congestion reporter module 440 can function to generate the congestion message 310 for the congested segment 312 for displaying on the first device 104 or the second device 106. The congestion reporter module 440 can receive the congested segment 312 from the congestion inference module 410. The congestion reporter module 440 can display the congestion message 310 in the location-based guide 302 by the first display interface 226 of FIG. 2. The congestion reporter module 440 can also express the congestion message 310 in other ways described in FIG. 3 by the first user interface 212 of FIG. 2 or the second user interface 232 of FIG. 2.

The congestion reporter module 440 can also store the congested segment 312 in a hash table 442 indexed by each of the road links 304. The congestion reporter module 440 can store the congested segment 312 in the hash table 442 indexed by each instance of the congested segment 312, where each instance of the congested segment 312 can identify the road links 304 contained within the congested segment 312. The congestion reporter module 440 can further store the congested segment 312 in a database 444 on either or both of the first device 104 and the second device 106.

Incident data is hard to get right in real time. For example, most incidents can have a 2-5 minute delays. The navigation system 100 is aimed at solving this problem by making inference of congestion from flow data.

It has been discovered that determining the congested segment 312 by tracking the real-time traffic flow 404 and the flow confidence 424 of the real-time traffic flow 404 can give users accurate navigation information before incident reports are received. Tracking the real-time traffic flow 404 of the road links 304 allow the navigation system 100 to infer the state of congestion for the road links 304. Tracking the flow confidence 424 during the process of inferring congestion increases the accuracy of the congestion estimation mechanism of the navigation system 100. Accordingly, determining the congested segment 312 by tracking the real-time traffic flow 404 and the flow confidence 424 give users more accurate navigation information faster.

For example, the first software 218 of FIG. 2 can include the flow receiver module 402, the congestion inference module 410, the threshold module 412, the smooth filter module 418, the aggregator module 432, the source confidence module 422, the tracker module 434, and the congestion reporter module 440.

The first control unit 206 of FIG. 2 can execute the first software 218 for the flow receiver module 402 to receive the real-time traffic flow 404 of the road links 304. The first control unit 206 can execute the first software 218 for the congestion inference module 410 to determine the congested segment 312 from the real-time traffic flow 404 of the road links 304. The first control unit 206 can execute the first software 218 for the congestion reporter module 440 to generate the congestion message 310 for the congested segment 312 for displaying on the first device 104.

The first control unit 206 can execute the first software 218 for the threshold module 412 to determine the congestion candidate links 414 from the road links 304 by thresholding the real-time traffic flow 404 of the road links 304. The first control unit 206 can execute the first software 218 for the smooth filter module 418 to smooth spatially the real-time traffic flow 404 of the congestion candidate links 414. The first control unit 206 can execute the first software 218 for the aggregator module 432 to for aggregating the congestion candidate links 414 adjacent to each other into the congested segment 312. The first control unit 206 can execute the first software 218 for the source confidence module 422 to calculate the flow confidence 424 of the real-time traffic flow 404 of the congestion candidate links 414. The first control unit 206 can execute the first software 218 for the tracker module 434 to determine the congested segment 312 by tracking the real-time traffic flow 404 and the flow confidence 424 of the congestion candidate links 414 over the time period 436.

The first control unit 206 can execute the first display interface 226 to display the location-based guide 302. The first control unit 206 can also execute the first display interface 226 to display the congestion message 310. The first control unit 206 can further execute the first display interface 226 to display a representation of the road links 304 or the congested segment 312.

The second software 236 of FIG. 2 of the second device 106 can include the navigation system 100. For example, the second software 236 can include the flow receiver module 402, the congestion inference module 410, the threshold module 412, the smooth filter module 418, the aggregator module 432, the source confidence module 422, the tracker module 434, and the congestion reporter module 440.

The second control unit 228 of FIG. 2 can execute the second software 236 for the flow receiver module 402 to receive the real-time traffic flow 404 of the road links 304. The second control unit 228 can execute the second software 236 for the congestion inference module 410 to determine the congested segment 312 from the real-time traffic flow 404 of the road links 304. The second control unit 228 can execute the second software 236 for the congestion reporter module 440 to generate the congestion message 310 for the congested segment 312 for displaying on the first device 104.

The second control unit 228 can execute the second software 236 for the threshold module 412 to determine the congestion candidate links 414 from the road links 304 by thresholding the real-time traffic flow 404 of the road links 304. The second control unit 228 can execute the second software 236 for the smooth filter module 418 to smooth spatially the real-time traffic flow 404 of the congestion candidate links 414. The second control unit 228 can execute the second software 236 for the aggregator module 432 to for aggregating the congestion candidate links 414 adjacent to each other into the congested segment 312. The second control unit 228 can execute the second software 236 for the source confidence module 422 to calculate the flow confidence 424 of the real-time traffic flow 404 of the congestion candidate links 414. The second control unit 228 can execute the second software 236 for the tracker module 434 to determine the congested segment 312 by tracking the real-time traffic flow 404 and the flow confidence 424 of the congestion candidate links 414 over the time period 436.

The second control unit 228 can execute the second display interface 234 of FIG. 2 to display the location-based guide 302. The second control unit 228 can also execute the second display interface 234 to display the congestion message 310. The second control unit 228 can further execute the second display interface 234 to display the road links 304 or the congested segment 312.

The navigation system 100 can be partitioned between the first software 218 and the second software 236. For example, the second software 236 can include the threshold module 412, the smooth filter module 418, the aggregator module 432, the source confidence module 422, and the tracker module 434. The second control unit 228 can execute modules partitioned on the second software 236 as previously described.

The first software 218 can include the flow receiver module 402 and the congestion reporter module 440. Based on the size of the first storage unit 208, the first software 218 can include additional modules of the navigation system 100. The first control unit 206 can execute the modules partitioned on the first software 218 as previously described.

For the flow receiver module 402, the first user interface 212 can, for example, receive portions of the real-time traffic flow 404 of the road links 304 from the user, the navigation system 100, an external system, an external data source, or a combination thereof. The second control unit 228 can operate the second communication unit 230 to send the real-time traffic flow 404 of the road links 304 or the congested segment 312 to the first device 104. The first control unit 206 can operate the first communication unit 210 to do the same. The first control unit 206 can operate the first software 218 to operate the location unit 214.

The second communication unit 230 can send the congestion message 310 to the first device 104 through the communication path 108. The congestion message 310, the location-based guide 302, the current location 308, or a combination thereof can be displayed on the first display interface 226 and the second display interface 234.

Thus, it has been discovered that the navigation system 100 of the present invention furnishes important and heretofore unknown and unavailable solutions, capabilities, and functional aspects for providing an effective and efficient communication.

The navigation system 100 describes the module functions or order as an example. The modules can be partitioned differently. For example, the threshold module 412 and the smooth filter module 418 can be combined. Each of the modules can operate individually and independently of the other modules.

Furthermore, data generated in one module can be used by another module without being directly coupled to each other. For example, the congestion reporter module 440 can receive the real-time traffic flow 404 of the flow receiver module 402 for displaying it on the first display interface 226.

The flow receiver module 402, the congestion inference module 410, the threshold module 412, the smooth filter module 418, the aggregator module 432, the source confidence module 422, the tracker module 434, and the congestion reporter module 440 can be implement in as hardware (not shown) within the first control unit 206, the second control unit 228, or special hardware (not shown) in the first device 104 or the second device 106.

The physical transformation from generating the congestion message 310 in the location-based guide 302 for displaying on the first device 104 results in movement in the physical world, such as people using the first device 104, the vehicle, or a combination thereof, based on the operation of the navigation system 100. The user of the navigation system 100 can use the location-based guide 302 to avoid the congested segment 312 and navigate around the congested segment 312. As the movement in the physical world occurs, the movement itself creates additional information that is converted back to the current location 308 of FIG. 3 for the continued operation of the navigation system 100 and to continue the movement in the physical world.

Moreover, the modules described above can be implemented in hardware and can be considered as hardware functional units in the first device 104 or in the second device 106 in addition to those described in FIG. 2, embedded into the functional units described in FIG. 2, such as in the first control unit 206 or the second control unit 228, or a combination thereof. For the purposes of this application, the modules are hardware implementation when claimed in apparatus claims.

Figure 5:
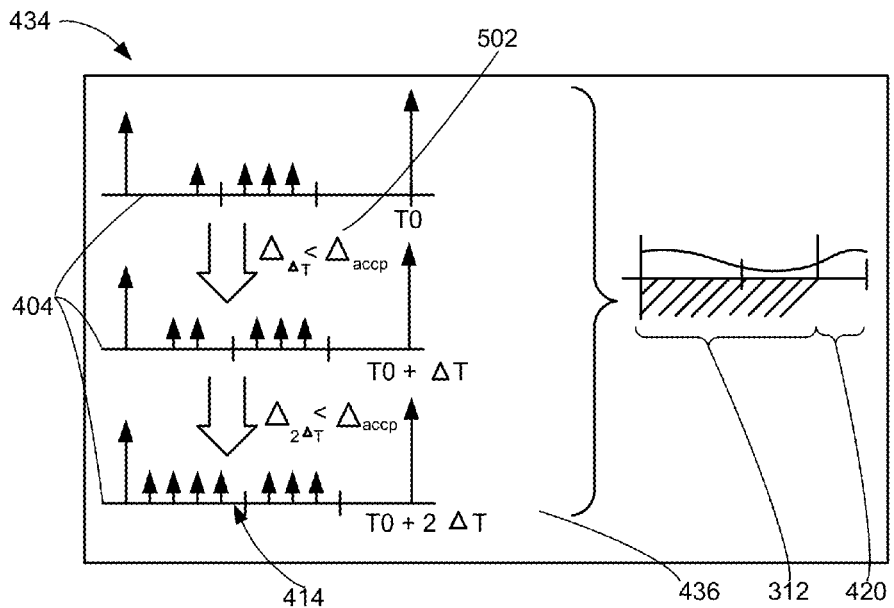
FIG. 5 is an example diagram of temporal monitoring by the tracker module of the navigation system.

Referring now to FIG. 5, therein is shown an example diagram of temporal monitoring by the tracker module 434 of the navigation system 100 of FIG. 1. The tracker module 434 can monitor the real-time traffic flow 404 with temporal monitoring. The congested segment 312 that occurs over time can be monitored for the time period 436. The congested segment 312 can be confirmed based on traffic density of the vehicle count 408 of FIG. 4, shown by arrows, over the time period 436. The congested segment 312 can also be calculated based on the vehicle velocities 406 of FIG. 4, shown by magnitudes of the arrows, of the vehicles.

The tracker module 434 can track the congested segment 312 for multiples of the time period 436. The congested segment 312 can be set to expire based on amount of deviation of the real-time traffic flow 404 of the congested segment 312 at one time from the real-time traffic flow 404 of the congested segment 312 at the one time plus the time period 436. For each multiple of the time period 436, the real-time traffic flow 404 of the congested segment 312 can be determined to within an acceptable deviation 502 and the minimum confidence 430 of FIG. 4.

The acceptable deviation 502 is defined as a difference threshold of the real-time traffic flow 404, where if the change of value of the real-time traffic flow 404 is outside the difference threshold, then the congested segment 312 will be set to expire. For example, if the acceptable deviation 502 is 5 mph, and the real-time traffic flow 404 of cars within the congested segment 312 changed from 35 mph to 45 mph, then the congested segment 312 will expire, indicating that the congestion has expired.

The acceptable deviation 502 can be user-defined. The acceptable deviation 502 can also be a system variable, such as a function of the average speed limit of the congestion candidate links 414 of the congested segment 312. The minimum confidence 430 can be user-defined. The minimum confidence 430 can also be a system variable, such as a function of the flow confidence 424 of FIG. 4 of the neighbor link 420 or the flow confidence 424 of all of the road links 304.

Figure 6:
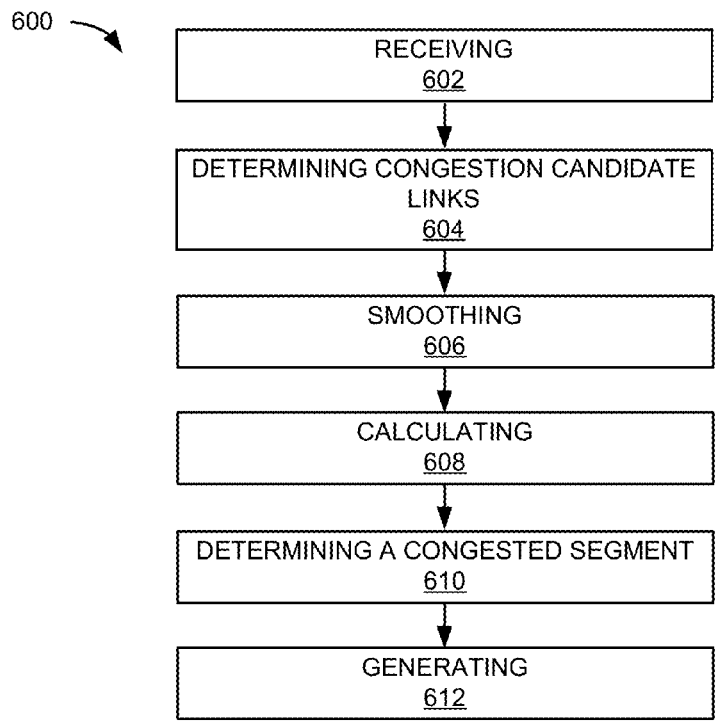
FIG. 6 is a flow chart of a method of operation of the navigation system in a further embodiment of the present invention.

Referring now to FIG. 6, therein is shown a flow chart of a method 600 of operation of the navigation system 100 in a further embodiment of the present invention. The method 600 includes: receiving a real-time traffic flow of road links in a block 602; determining congestion candidate links from the road links by thresholding the real-time traffic flow of the road links in a block 604; smoothing spatially the real-time traffic flow of the congestion candidate links in a block 606; calculating a flow confidence of the real-time traffic flow of the congestion candidate links in a block 608; determining a congested segment by tracking the real-time traffic flow and the flow confidence of the congestion candidate links over a time period in a block 610; and generating a congestion message for the congested segment for displaying on a device in a block 612.

The resulting method, process, apparatus, device, product, and/or system is straightforward, cost-effective, uncomplicated, highly versatile, accurate, sensitive, and effective, and can be implemented by adapting known components for ready, efficient, and economical manufacturing, application, and utilization.

Another important aspect of the present invention is that it valuably supports and services the historical trend of reducing costs, simplifying systems, and increasing performance.

These and other valuable aspects of the present invention consequently further the state of the technology to at least the next level.

While the invention has been described in conjunction with a specific best mode, it is to be understood that many alternatives, modifications, and variations will be apparent to those skilled in the art in light of the aforegoing description. Accordingly, it is intended to embrace all such alternatives, modifications, and variations that fall within the scope of the included claims. All matters hithertofore set forth herein or shown in the accompanying drawings are to be interpreted in an illustrative and non-limiting sense.

What is claimed is:

1. A method of operation of a navigation system comprising:
  receiving a real-time traffic flow of road links;
  determining congestion candidate links from the road links based on comparing a speed threshold and the real-time traffic flow of the road links;
  smoothing spatially the real-time traffic flow of the congestion candidate links with a control unit;
  calculating a flow confidence of the real-time traffic flow of the congestion candidate links;
  determining a congested segment by tracking the real-time traffic flow and the flow confidence of the congestion candidate links over a time period; and generating a congestion message for the congested segment for displaying on a device.

2. The method as claimed in claim 1 further comprising filtering the congestion candidate links based on the speed threshold and the real-time traffic flow after the real-time traffic flow are smoothed.

3. The method as claimed in claim 1 wherein calculating the flow confidence includes calculating the flow confidence of the real-time traffic flow of the congestion candidate links based on a vehicle count of the congestion candidate links.

4. The method as claimed in claim 1 wherein calculating the flow confidence includes calculating the flow confidence of the real-time traffic flow of the congestion candidate links based on an age of the real-time traffic flow.

5. The method as claimed in claim 1 wherein calculating the flow confidence includes calculating the flow confidence of the real-time traffic flow of the congestion candidate links based on the real-time traffic flow of a neighbor link of the congestion candidate links.

6. A method of operation of a navigation system comprising:
receiving a real-time traffic flow of road links;
determining congestion candidate links from the road links based on comparing a speed threshold and the real-time traffic flow of the road links;
smoothing spatially the real-time traffic flow of the congestion candidate links with a control unit;
calculating a flow confidence of the real-time traffic flow of the congestion candidate links based on a neighbor link of the congestion candidate links;
determining a congested segment by tracking the real-time traffic flow and the flow confidence of the congestion candidate links over a time period; and
generating a congestion message for the congested segment for displaying on a device.

7. The method as claimed in claim 6 wherein determining the congested segment includes determining the congested segment based on a physical length of the congestion candidate links.

8. The method as claimed in claim 6 wherein determining the congested segment includes determining the congested segment based on an average speed limit of the congested segment.

9. The method as claimed in claim 6 wherein determining the congested segment includes smoothing temporally the real-time traffic flow of the congestion candidate links over the time period.

10. The method as claimed in claim 6 further comprising filtering out a portion of the real-time traffic flow of the congestion candidate links when the flow confidence of the portion is below or equal to a minimum confidence.

11. A navigation system comprising:
a flow receiver module, for receiving a real-time traffic flow of road links;
a threshold module, coupled to the flow receiver module, for determining congestion candidate links from the road links based on comparing a speed threshold and the real-time traffic flow of the road links;
a smooth filter module, coupled to the threshold module, for smoothing spatially the real-time traffic flow of the congestion candidate links;
a source confidence module, coupled to the smooth filter module, for calculating a flow confidence of the real-time traffic flow of the congestion candidate links;
a tracker module, coupled to the source confidence module, for determining a congested segment by tracking the real-time traffic flow and the flow confidence of the congestion candidate links over a time period; and
a congestion reporter module, coupled to the tracker module, for generating a congestion message for the congested segment for displaying on a device.

12. The system as claimed in claim 11 further comprising an aggregator module, coupled to the source confidence module and the smooth filter module, for filtering the congestion candidate links based on the speed threshold and the real-time traffic flow after the real-time traffic flow are smoothed.

13. The system as claimed in claim 11 wherein the source confidence module is for calculating the flow confidence of the real-time traffic flow of the congestion candidate links based on a vehicle count of the congestion candidate links.

14. The system as claimed in claim 11 wherein the source confidence module is for calculating the flow confidence of the real-time traffic flow of the congestion candidate links based on an age of the real-time traffic flow.

15. The system as claimed in claim 11 wherein the smooth filter module is for smoothing spatially the real-time traffic flow of the congestion candidate links based on a neighbor link of the congestion candidate links.

16. The system as claimed in claim 11 wherein the source confidence module is for calculating the flow confidence of the real-time traffic flow of the congestion candidate links based on a neighbor link of the congestion candidate links.

17. The system as claimed in claim 16 wherein the tracker module is for determining the congested segment based on a physical length of the congestion candidate links.

18. The system as claimed in claim 16 wherein the tracker module is for determining the congested segment based on an average speed limit of the congested segment.

19. The system as claimed in claim 16 wherein the tracker module is for smoothing temporally the real-time traffic flow of the congestion candidate links over a time period.

20. The system as claimed in claim 16 wherein the source confidence module is for filtering out a portion of the real-time traffic flow of the congestion candidate links when the flow confidence of the portion is below or equal to a minimum confidence.

* * * * *